US012036700B2

(12) United States Patent
Naya et al.

(10) Patent No.: US 12,036,700 B2
(45) Date of Patent: Jul. 16, 2024

(54) DIVIDING DEVICE FOR WAFER

(71) Applicant: NAKAMURA-TOME PRECISION INDUSTRY CO., LTD., Ishikawa (JP)

(72) Inventors: Tsuyoshi Naya, Kanazawa (JP); Masakazu Takazawa, Nonoichi (JP)

(73) Assignee: NAKAMURA-TOME PRECISION INDUSTRY CO., LTD., Hakusan (JP)

(*) Notice: Subject to any disclaimer, the term of this patent is extended or adjusted under 35 U.S.C. 154(b) by 871 days.

(21) Appl. No.: 17/084,767

(22) Filed: Oct. 30, 2020

(65) Prior Publication Data

US 2021/0129380 A1 May 6, 2021

(30) Foreign Application Priority Data

Nov. 6, 2019 (JP) .................................. 2019-201105

(51) Int. Cl.
*B28D 5/00* (2006.01)
*B23K 26/40* (2014.01)
*B23K 103/00* (2006.01)

(52) U.S. Cl.
CPC .......... *B28D 5/0052* (2013.01); *B28D 5/0011* (2013.01); *B28D 5/0017* (2013.01); *B28D 5/0029* (2013.01); *B23K 2103/56* (2018.08); *Y10T 225/12* (2015.04); *Y10T 225/325* (2015.04)

(58) Field of Classification Search
CPC .. B28D 5/0052; B28D 5/0029; B28D 5/0023; Y10T 225/325; Y10T 225/329; Y10T 225/371; Y10T 225/12; Y10T 225/30; Y10T 225/321; Y10T 225/35; Y10T 225/357; Y10T 225/364; B26F 3/002

USPC .......................... 225/96.5, 97, 100–103, 35
See application file for complete search history.

(56) References Cited

U.S. PATENT DOCUMENTS 4,044,937 A * 8/1977 Hill ...................... B28D 5/0029
225/97
6,427,747 B1 * 8/2002 Omi .................. H01L 21/67092
15/418
9,159,596 B2 * 10/2015 Young ................... B32B 43/006
(Continued)

FOREIGN PATENT DOCUMENTS

JP 5509448 B2 6/2014
JP 2015-223589 A 12/2015
JP 2017-220631 A 12/2017

OTHER PUBLICATIONS

Apr. 9, 2021 Extended Search Report issued in European Patent Application No. 20205707.1.

*Primary Examiner* — Laura M Lee
(74) *Attorney, Agent, or Firm* — Oliff PLC

(57) ABSTRACT

A dividing device divides a wafer from an ingot by slicing the ingot by using a dividing layer which is formed by relatively moving a laser beam to a predetermined depth of the ingot from one of both end faces of the ingot. The dividing device for a wafer includes: first fixing part that fixes the other of the both end faces of the ingot; second fixing part that is arranged on a first central axis line of the ingot so as to face the first fixing part and fixes the one of the both end faces of the ingot; and tension part that apply a tensile force to the ingot via the first and second fixing parts. The tension part rotates one end of the dividing layer with another end as a fulcrum so as to generate moments for slicing the ingot with the dividing layer as a boundary.

8 Claims, 4 Drawing Sheets

(56) References Cited

U.S. PATENT DOCUMENTS

| | | | | |
|---|---|---|---|---|
| 9,165,802 | B2* | 10/2015 | Young | B32B 38/10 |
| 9,884,389 | B2* | 2/2018 | Hirata | C30B 33/06 |
| 9,925,755 | B2* | 3/2018 | Young | H01L 21/67092 |
| 10,870,176 | B2* | 12/2020 | Hirata | B23K 26/40 |
| 11,538,698 | B2* | 12/2022 | Kayser | H01L 21/67092 |
| 2006/0286769 | A1* | 12/2006 | Tsuchiya | B65H 3/0816 |
| | | | | 438/458 |
| 2015/0101758 | A1* | 4/2015 | Honda | B32B 38/18 |
| | | | | 156/767 |
| 2016/0074960 | A1 | 3/2016 | Hirata et al. | |
| 2021/0129380 | A1* | 5/2021 | Naya | B28D 5/0011 |
| 2023/0073379 | A1* | 3/2023 | Nomura | B28D 5/0052 |

* cited by examiner

DIVIDING DEVICE FOR WAFER

CROSS REFERENCE TO RELATED APPLICATION

This application is based upon and claims the benefit of priority to Japanese Patent Application No. 2019-201105 filed on Nov. 6, 2019, the entire contents of which are incorporated herein by reference.

BACKGROUND

The present disclosure relates to a dividing device for dividing a substrate-like wafer from an ingot by slicing.

Wafers such as Si wafers, SiC wafers, GaN wafers, and the like, which have cleavability and are formed of a semiconductor material of a single crystal having a single crystal orientation or an epitaxial crystal, have been conventionally cut from a columnar ingot into a thin disk shape by a wire saw or the like. However, it does not only cause a material loss due to cutting margins, but also causes distortions and processing damages due to contact processing of a wire saw to be applied to a wafer.

In addition, for a semiconductor material having high hardness, such as SiC, cutting itself is difficult.

Then, for example, JP-B-5509448 discloses a method for slicing a wafer by applying a laser beam from a substrate surface (ingot end face) to form a modified layer inside the substrate while condensing the laser beam inside the substrate and relatively moving the condensed position of this laser beam on the substrate.

However, in a slicing method disclosed in this publication, a modified layer is exposed on a side wall of an ingot and a groove is formed at the side wall, and a v-shaped press-fit material needs to be press-fit into this groove; which requires a complicated device and process, and many man-hours.

In addition, for example, JP-A-2015-223589 discloses a technique for dividing a wafer from a SiC ingot by forming a layer in which both carbon and silicon exist, at an inside of the ingot by irradiation of a laser beam. However, dividing means therefor is required to heat part of an upper end of the ingot so as to cause warpage to occur in that part; which also requires a complicated process.

BRIEF DESCRIPTION OF THE DRAWINGS

FIG. 1A illustrates a front view seen along a shaft support part; FIG. 1B illustrates a side surface view thereof; and FIG. 1C illustrates an A-A line cross-sectional view;

DESCRIPTION OF EXEMPLARY EMBODIMENTS

Figure 1A:
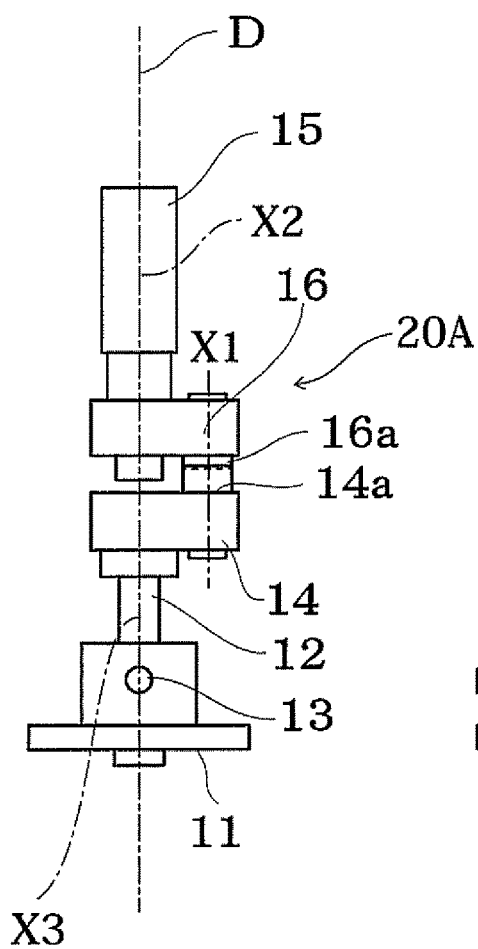
FIG. 1A to FIG. 1C schematically illustrate a structure example of a dividing device.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

The present disclosure has been made in order to provide a dividing device with a simple structure and high productivity for dividing a wafer from an ingot.

In accordance with one of some embodiments, there is provided a dividing device for a wafer, the dividing device dividing the wafer from an ingot by slicing the ingot with a division layer as a boundary, the division layer being formed by relatively moving a laser beam along one of both end faces of the ingot, the laser beam being condensed to a predetermined depth of the ingot from the one of the both ends of the ingot;

the dividing device comprising:

first fixing part that fixes another of the both end faces of the ingot;

second fixing part that is arranged on a first central axis line of the ingot so as to face the first fixing part and fixes the one of the both end faces of the ingot; and tension part that applies a tensile force to the ingot via the first fixing part and the second fixing part, wherein the tension part rotates one end of the division layer with another end of the division layer as a fulcrums as to generate a moment for slicing the ingot with the division layer as the boundary.

Thus, when the moment is generated in the division layer between the ingot and the wafer to be divided from the ingot, the wafer is sliced off such that a crack gradually propagates along the division layer by an opening direction (rotation direction) force that is applied to the other end of the division layer with the another end of the division layer as a fulcrum. Therefore, the flatness of a wafer main surface tends to be uniform in the surface and only a smaller division force is needed than the related art.

There is no limitation on means for applying a division load as long as it generates a moment in the division layer.

Here, as means for forming the division layer for dividing a wafer from the ingot by slicing, known means can be used for moving a laser-beam condensed position relative to the ingot while condensing a laser beam into the ingot.

In the disclosure, when a wafer is divided from the ingot, not only a division load applied to the division layer but also a moment force is made to act; this causes gradual peeling from the one end of the division layer and thus, wafers can be divided and manufactured in a short time with a simple structure.

In accordance with one of some embodiments, there is provided the dividing device for a wafer, wherein the tension part includes:

holding part that holds the first fixing part; and moving part that moves the second fixing part in a direction away from the holding part to apply a tensile force to the ingot, the holding part includes a second central axis that is coaxial with or parallel to the first central axis, and the moving part includes a third central axis that is coaxial with or parallel to the first central axis and is moved by a driving force acting along the third central axis, and at least one of the second central axis and the third central axis is offset from the first central axis.

Here, the tensile force (referred to as a first tensile force) is generated along the third central axis due to movement of the moving part and a reaction force (referred to as a second tensile force) of the first tensile force is generated along the second central axis of the holding part, thereby causing the both end surfaces of the ingot to be pulled. Then, when at least one of the second central axis and the third central axis is offset from the first central axis of the ingot, at least one of the first tensile force and second tensile force is an eccentric load that acts on the division layer and the eccentric load can generate the moment. In an offset arrangement structure, the structure of a device capable of generating the moment is simplified and continuous manufacturing also becomes easy.

In accordance with one of some embodiments, there is provided the dividing device for a wafer, wherein the second central axis and the third central axis are coaxial with each other, and are offset from the first central axis.

Thus, when both the second central axis and the third central axis are offset from the first central axis, opposite moments each causing the division layer to be cracked can be generated on both sides of the division layer.

In accordance with one of some embodiments, there is provided the dividing device for a wafer, wherein one of the second central axis and the third central axis is coaxial with the first central axis, and another of the second central axis and the third central axis is offset from the first central axis.

Thus, even when one of the second central axis and the third central axis is coaxial with the first central axis and the other of the second central axis and the third central axis is offset from the first central axis, the moment can be generated due to an eccentric load.

In accordance with one of some embodiments, there is provided the dividing device for a wafer, wherein the second central axis is offset from the first central axis, and the holding part includes:

a shaft that extends along the second central axis, and has one end part and another end part;

a coupling part that couples the one end part of the shaft and the first fixing part; and a supporting part that pivotally and rotatably supports the other end part of the shaft.

In this case, the moment can be easily generated by the rotation of the shaft.

In accordance with one of some embodiments, there is provided the dividing device for a wafer, wherein the second central axis is offset from the first central axis, the holding part includes:

a shaft that extends along the second central axis, and has one end part and another end part;

a coupling part that couples the one end part of the shaft and the first fixing part; and a supporting part that fixedly supports the other end part of the shaft, and the shaft has elasticity.

In this case, the moment can be easily generated due to an elastic deformation of the shaft.

In accordance with one of some embodiments, there is provided the dividing device for a wafer, wherein the second central axis is offset from the first central axis, the holding part includes:

a shaft that extends along the second central axis, and has one end part and another end part;

a coupling part that couples the one end part of the shaft and the first fixing part; and a supporting part that fixedly supports the other end part of the shaft, and the coupling part has elasticity.

In this case, the moment can be easily generated due to an elastic deformation of the coupling part.

Structure examples of a dividing device for dividing a wafer from an ingot by slicing according to embodiments of the present disclosure will be described below with reference to drawings.

The disclosure is characterized by a dividing device; and for forming a division layer between an ingot and a wafer by making condensing part of a laser beam relatively move along an end face of the ingot while condensing a laser beam from the ingot end face to a predetermined inside depth, a known technique can be applied and therefore, description of its process will be omitted.

A first embodiment of the dividing device is illustrated in FIG. 1A to FIG. 1C, and FIG. 2.

Figure 2:
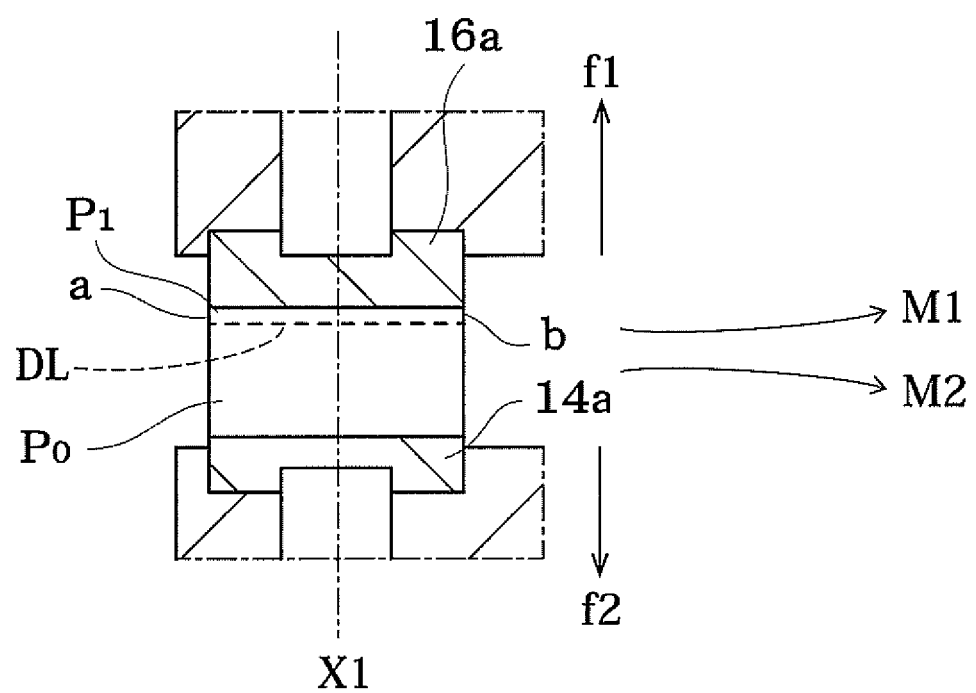
FIG. 2 illustrates an enlarged view of a vicinity of a division layer of a wafer and an ingot.

First, an ingot $P_0$ includes a division layer DL that is formed by relatively moving a laser beam, which is condensed from one of both end faces of the ingot $P_0$ to a predetermined depth of the ingot $P_0$, along one of the both end faces of the ingot $P_0$, as illustrated in FIG. 2. The dividing device divides off a wafer $P_1$ which is sliced off from an ingot $P_0$ by using the division layer DL as a boundary. The wafer $P_1$ is a part of the ingot $P_0$ before the wafer $P_1$ is divided off; and after divided, it is separated from the ingot $P_0$. In the following description, it is collectively referred to as the ingot $P_0$ without differentiating between the ingots before and after the wafer $P_1$ is divided off. Similarly, it is collectively referred to as the wafer $P_1$ without differentiating between wafers before and after division of the wafers from the ingot $P_0$. In addition, in both the end faces of the ingot $P_0$ before division, an end face that is a part of the wafer $P_1$ is referred to as one end face and an opposite side of the one end face is referred to as the other end face.

The dividing device includes first and second fixing parts 14a and 16a that fix both the end faces of the ingot $P_0$, as illustrated in FIG. 2. The first and second fixing parts 14a and 16a fix both the end faces of the ingot $P_0$ by absorption, for example. The central axis of the ingot $P_0$ is referred to as a first central axis X1. The first and second fixing parts 14a and 16a are arranged on the first central axis X1 so as to face each other. The first fixing part 14a fixes the one end face (end face of the wafer $P_1$) of the ingot $P_0$; and the second fixing part 16a fixes the other end face of the ingot $P_0$.

Figure 1B:
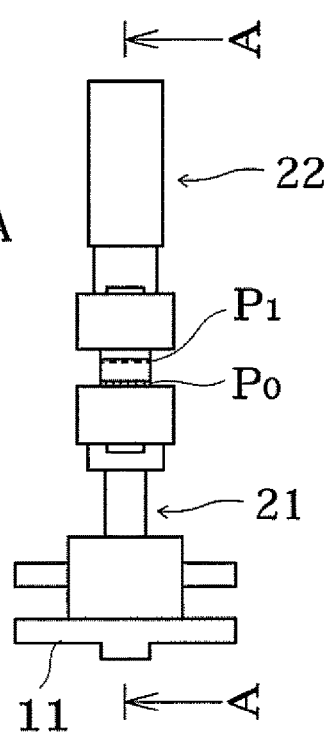
Figure 1C:
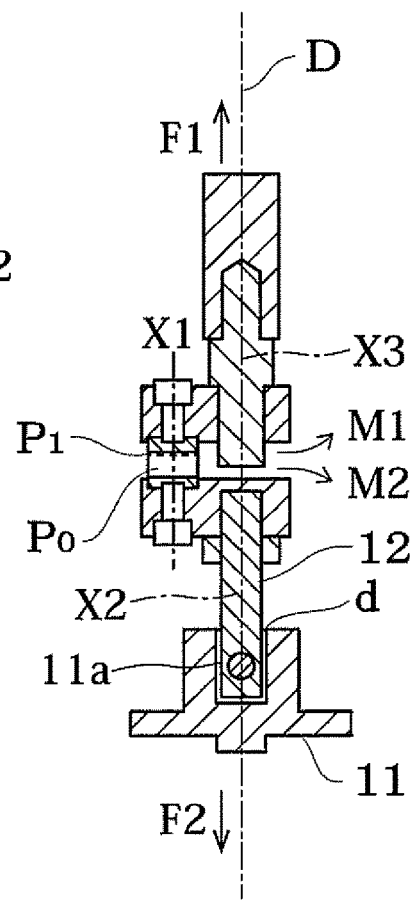

The dividing device includes a tension device 20A that applies a tensile force to the ingot $P_0$ via the first fixing part 14a and the second fixing part 16a, as illustrated in FIG. 1. The tension device 20A rotates one end b of the division layer DL with the other end a of the division layer DL as a fulcrum to generate moments M (M1 and M2 in FIG. 1C and FIG. 2, M in FIG. 3C, M in FIG. 4A) for slicing the ingot $P_0$ with the division layer DL as a boundary.

The tension device 20A can include, for example, a holding part 21 that is arranged below the ingot $P_0$, and a moving part 22 that is arranged above the ingot $P_0$. The holding part 21 holds the first fixing part 14a. The moving part 22 moves the second fixing part 16a in a direction away from the holding part 21 to apply a tensile force to the ingot $P_0$.

The holding part 21 includes the second central axis X2 that is coaxial with or parallel to the first central axis X1; and the moving part 22 includes the third central axis X3 that is coaxial with or parallel to the first central axis X1 and is moved by a driving force F1 acting along the third central axis X3. A reaction force F2 that is reverse to the driving force F1 is generated along the second central axis X2 of the holding part 21. Although part that generates the driving force F1 is not described, an electric, hydraulic, or other type of driving source and a toggle mechanism as a driving mechanism can be suitably used.

Here, in this embodiment, at least one of the second central axis X2 and the third central axis X3 is offset from the first central axis X1. This offset arrangement causes the driving force F1 and/or the reaction force F2 to act as an eccentric load to the division layer DL, thereby causing the moments M (M1 and/or M2).

In the embodiment illustrated in FIG. 1A to FIG. 1C, the holding part 21 includes a fixing holder 11, a shaft part 12, a shaft support part 13, and a first coupling part 14.

On an upper part of the fixing holder 11 that is mounted on a base part (not illustrated) of the device, the shaft support part 13 pivotally supporting a lower side of the shaft part 12 by using a pivot shaft is formed.

As illustrated in FIG. 1C, a concaved part IIa is formed in the fixing holder 11 and a predetermined clearance d is made between an inner peripheral surface of the concaved part 11a and the shaft part 12. This allows the shaft part 12 to be rotatable within a predetermined range in a left and right direction in FIG. 1C.

In the embodiment illustrated in FIG. 1A to FIG. 1C, the moving part 22 includes a division driving part 15 and a second coupling part 16.

On the third central axis X3 that is coaxial with the second central axis X2 along which this shaft part 12 stands erect, the division driving part 15 is arranged and the division driving part 15 for generating a driving force F1 along the third central axis X3 is controlled to be raised and lowered.

Herein, a vertical central line passing through the second central axis X2 and the third central axis X3 is represented as a division driving axis D.

On an upper side of the shaft part 12, the first coupling part 14 in which the first fixing part 14a for fixing the ingot $P_0$ is arranged is fixedly coupled at a position that is offset to a right side, in FIG. 1A, of the division driving axis D.

On the other hand, on a lower side of the division driving part 15, the second coupling part 16 for arranging the second fixing part 16a for the wafer $P_1$ is fixedly coupled at a position opposed to the first fixing part 14a of the ingot $P_0$.

By raising the division driving part 15 along the division driving axis D as illustrated in FIG. 1A, a tensile load F1in an upward division direction is applied to the wafer $P_1$ via the second coupling part 16 and the second fixing part 16a. Then, as indicated by arrows in FIG. 1C, due to an offset between the first and third central axes X1-X3, the tensile load F1 is an eccentric load for the division layer DL, in addition to the division load. This causes a moment M1 in a counterclockwise direction to be generated in the division layer DL via the second fixing part 16a as shown in FIG. 2. On the other hand, as a reaction force of the tensile load F1, a reaction force F2 in a downward division direction is generated as shown in FIG. 1C. Due to an offset between the first and second central axes X1-X2, the reaction force F2 is an eccentric load for the division layer DL. This causes a moment M2 in a clockwise direction to be generated in the division layer DL via the first fixing part 14a as shown in FIG. 2. Note that when the tensile load F1 is applied, the shaft part 12 rotates and the moment M2 corresponds to the rotation direction of the shaft part 12. By rotating the shaft part 12, a force of the moment M2 is easily generated.

This causes a vertical component force f1 of a force of the moment M1 to act on the division layer DL of the wafer $P_1$ and the ingot $P_0$ such that the force f1 is acted on one end "b" at an inside when viewed from the division driving line D, and the other end "a" at an outside is used as a fulcrum in FIG. 2. Similarly, in the division layer DL, a vertical component force f2 of the force of the moment M2 acts on the one end "b" at the inside with the other end "a" at the outside as a fulcrum. This causes a crack to be gradually formed from the one end "b" toward the other end "a" on the division layer DL. Thus, the wafer $P_1$ is easily divided and separated from the ingot $P_0$ in a short time.

In the above embodiment, the lower side of the shaft part 12 is pivotally supported, so that the force of the moment M2 is easily generated; the same effect is also generated by manufacturing this shaft part 12 with an elastic material such as a metal having a relatively small elastic modulus (Young's modulus), for example. Similarly, the same effect is generated by manufacturing the first coupling part 14 with an elastic material such as a metal having a relatively small elastic modulus (Young's modulus), for example.

Figure 3A:
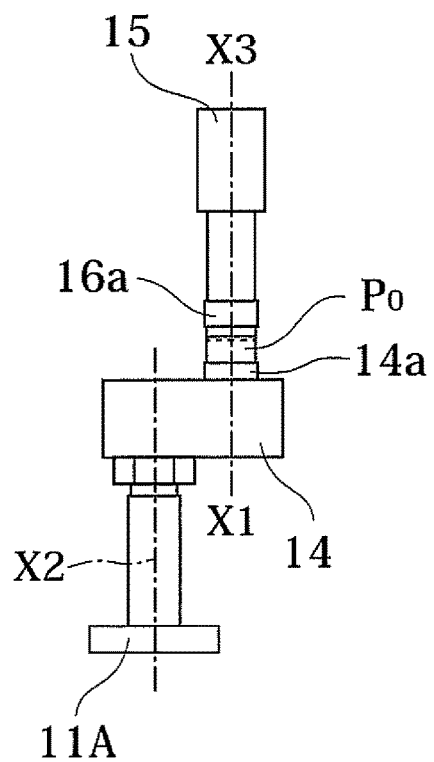
FIG. 3A to FIG. 3C illustrate examples of an offset arrangement of a second central axis of holding means with respect to a first central axis of an ingot.
Figure 3B:
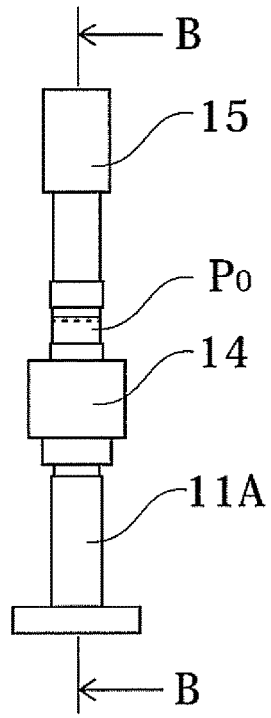
Figure 3C:
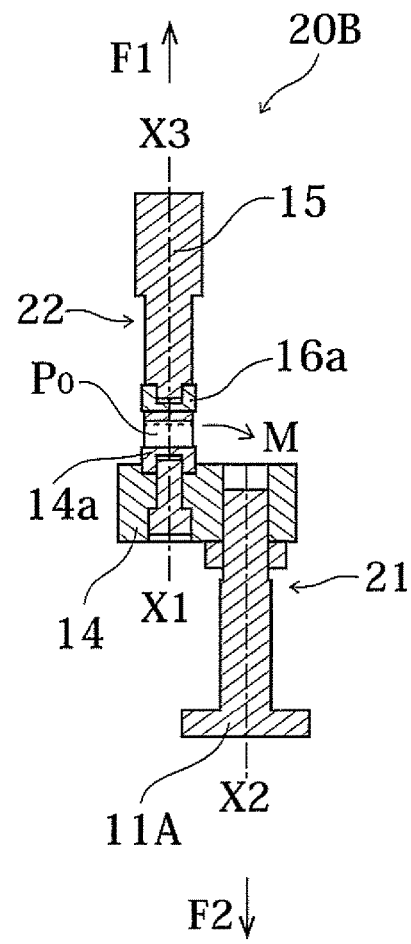

FIG. 3A to FIG. 3C illustrate a tension device 20B according to a second embodiment.

In this embodiment, the third central axis X3 of the moving part 22 is coaxial with the first central axis X1 and the second central axis X2 of the holding part 21 is offset from the first central axis X1 to generate moment M in FIG. 3C for slicing the ingot $P_0$ with the division layer DL as a boundary. For this purpose, the coupling part 14 is fixed on an upper side of the fixing holder 11A, so that the first fixing part 14a of the ingot $P_0$ is offset from this fixing holder 11A; and the second fixing part 16a of the wafer $P_1$ is arranged on the third central axis X3 of the division driving part 15.

Figure 4A:
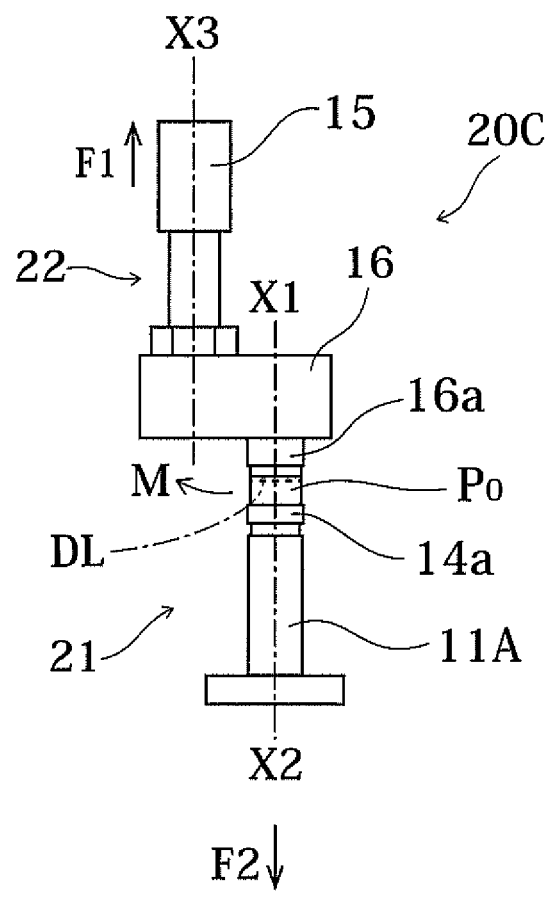
FIG. 4A and FIG. 4B illustrate examples of an offset arrangement of a third central axis of moving means with respect to the first central axis of the ingot.
Figure 4B:
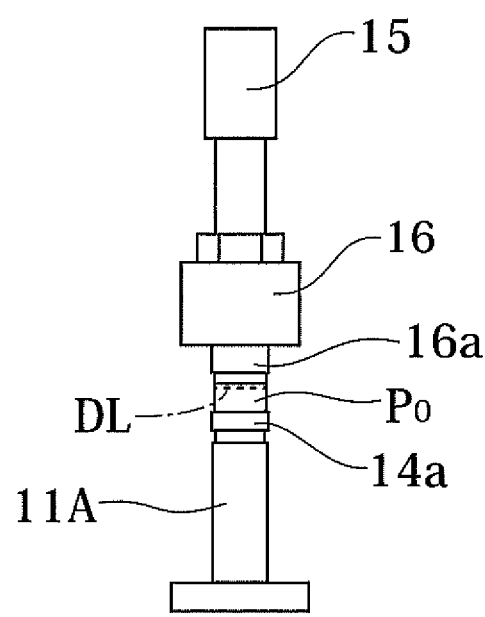

FIG. 4A and FIG. 4B illustrate a tension device 20C according to a third embodiment.

In this embodiment, the second central axis X2 of the holding part 21 is coaxial with the first central axis X1 and the third central axis X3 of the moving part 22 is offset from the first central axis so as to generate moment M in FIG. 4A for slicing the ingot $P_0$ with the division layer DL as a boundary. For this purpose, the coupling part 16 is fixed on a lower side of the division driving part 15, so that the second fixing part 16a of the wafer $P_1$ is offset from the division driving part 15; and the first fixing part 14a of the ingot $P_0$ is arranged on the second central axis X2 of the fixing holder 11A.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A dividing device for a wafer, the dividing device dividing the wafer from an ingot by slicing the ingot with a division layer as a boundary, the division layer being formed by relatively moving a laser beam along one of both end faces of the ingot, the laser beam being condensed to a predetermined depth of the ingot from the one of the both ends of the ingot;

the dividing device comprising:
- a first fixing part that is configured to fix the other of the end faces of the ingot;
- a second fixing part that is arranged on a first central axis line of the ingot so as to face the first fixing part and is configured to fix the one of the end faces of the ingot; and
- a tension part that is configured to apply a tensile force to the ingot via the first fixing part and the second fixing part, wherein the tension part is configured to rotate a first end of the division layer with a second end of the division layer as a fulcrum so as to generate a moment for slicing the ingot with the division layer as the boundary;

the tension part includes:
- a holding part that holds the first fixing part; and
- a moving part that is configured to move the second fixing part in a direction away from the holding part to apply a tensile force to the ingot;

the holding part includes a second central axis that is coaxial with or parallel to the first central axis, and the moving part includes a third central axis that is coaxial with or parallel to the first central axis and the moving part is configured to be moved by a driving force acting along the third central axis;

the holding part further includes:
- a shaft that extends along the second central axis, and has a first end part and a second end part;
- a coupling part that couples the first end part of the shaft and the first fixing part; and
- a supporting part that pivotally and rotatably supports the second end part of the shaft so as to allow the shaft to be rotatable within a predetermined range; and the second central axis is offset from the first central axis.

2. The dividing device for a wafer according to claim 1, wherein the second central axis and the third central axis are coaxial with each other, and are offset from the first central axis.

3. The dividing device for a wafer according to claim 1, wherein the third central axis is coaxial with the first central axis.

4. The dividing device for a wafer according to claim 1, wherein
the holding part includes:
- a supporting part that fixedly supports the other end part of the shaft, and the shaft has elasticity.

5. The dividing device for a wafer according to claim 1, wherein
the holding part includes:
- a supporting part that fixedly supports the other end part of the shaft, and
- the coupling part has elasticity.

6. The dividing device for a wafer according to claim 1, wherein the supporting part pivotally and rotatably supports the second end part of the shaft with the second end of the division layer as a fulcrum.

7. The dividing device for a wafer according to claim 1, wherein the supporting part pivotally and rotatably supports the second end part of the shaft by extending through the second end of the shaft in a direction traverse to the second central axis.

8. The dividing device for a wafer according to claim 1, wherein the shaft that extends along the second central axis does not directly contact the moving part.

* * * * *